(12) United States Patent
Page et al.

(10) Patent No.: US 8,126,412 B2
(45) Date of Patent: Feb. 28, 2012

(54) ULTRA LOW POWER RF LINK

(75) Inventors: Edward A. Page, Kensington, MD (US);
Avetis Ioannisyan, Hudson, NH (US);
Kenneth R. Erikson, Henniker, NH (US)

(73) Assignee: Frantorf Investments GmbH, LLC, Dover, DE (US)

( * ) Notice: Subject to any disclaimer, the term of this patent is extended or adjusted under 35 U.S.C. 154(b) by 0 days.

(21) Appl. No.: 12/797,031

(22) Filed: Jun. 9, 2010

(65) Prior Publication Data
US 2010/0246654 A1 Sep. 30, 2010

Related U.S. Application Data

(63) Continuation of application No. 11/222,425, filed on Sep. 8, 2005, now Pat. No. 7,787,846.

(51) Int. Cl.
*H04B 1/06* (2006.01)
*H04B 7/00* (2006.01)
(52) U.S. Cl. ........ 455/230; 455/231; 455/275; 455/41.2
(58) Field of Classification Search .............. 455/41.2, 455/41.3, 63.1, 334, 269, 275, 276.1, 230, 455/231; 375/316
See application file for complete search history.

(56) References Cited

U.S. PATENT DOCUMENTS
7,324,606 B2 1/2008 Eilts et al.

*Primary Examiner* — Eugene Yun

(57) ABSTRACT

A receiver including a processor. A plurality of Fast Fourier Transforms of a plurality of signal segments of a signal can be determined by the processor. The plurality of Fast Fourier Transforms are stored. A frequency shift of the signal can be determined recursively based on the stored plurality of Fast Fourier Transforms of the plurality of signal segments.

20 Claims, 5 Drawing Sheets

ULTRA LOW POWER RF LINK

CROSS REFERENCE TO RELATED APPLICATIONS

The present application is a continuation of U.S. patent application Ser. No. 11/222,425 filed Sep. 8, 2005, which is incorporated herein by reference in its entirety.

TECHNICAL FIELD

The invention relates to radio frequency (RF) transmissions, and in particular, narrowband RF transmissions of information from sensors at low data rates.

BACKGROUND

Radio frequency transmissions of voice and data are used in many commercial, industrial and military situations. In some applications of RF technology, the size and power requirements of the transmission and reception equipment are not a crucial factor. For example, a radio station in a major metropolitan area can well afford very large transmitting towers from which highly amplified signals are radiated over substantial distances. In other applications however, for example when the transmitter and/or receiver are hand-held devices using commercial off the shelf (COTS) components, the size and power requirements of the equipment become much more critical. That is, as the equipment becomes smaller, the available space for power supplies, usually a battery, becomes commensurately smaller. With the smaller power supply, the range for a RF transmitter decreases, and/or the lifespan of the power supply decreases.

In applications where the power supply is somewhat limited, power can be conserved by narrowing the receiver bandwidth, thus decreasing the transmission data rate. Alternatively, the power in such situations can be kept at the same level, and the data can be transmitted over a greater range through narrower bandwidth transmission and consequent decrease in the data rate. However, by narrowing the bandwidth, any drift or fluctuation in the transmitting frequency or receiver electronics, especially at higher transmission frequencies, will result in lost data and other errors. There is therefore lacking in the art a reliable RF system that can increase the range of transmission by narrowing the bandwidth, thus decreasing the data transmission rate.

SUMMARY OF AN EMBODIMENT

One particular embodiment of the invention addresses RF applications in which very low data transmission rates are acceptable, and compact battery powered implementation is required. An embodiment of the invention therefore reduces the bandwidth of transmitter and receiver components that are necessary to transmit sensor data and/or voice transmissions (using a reduced vocabulary set) over greater distances. The system uses remotely deployed battery powered sensors in association with portable communication devices to transmit data over substantially longer ranges than is presently possible using the best available technology. In one embodiment, a compact device, when operating at one watt, will transmit over a range comparable to a 3000 watt transmission using the equipment and techniques of the prior art. Stated another way, a reduction in transmission rate and bandwidth by a factor of N provides the same transmission range using one $N^{th}$ (1/N) the power. Such an embodiment can also transmit to a satellite using 10 mW of power, or for distances in excess of 500 feet through a highly obstructed building interior. Embodiments of the invention may be used in connection with a wide variety of sensors. Sensors of physical phenomena such as temperature, heat, pressure, flow, fluid level, vibration, attitude, gravity, strain, voltage, current, an open switch, a closed switch, light, electromagnetic radiation, sound, or radiation may be employed. In addition such a sensor may detect the presence of a person or animal, water, a gas, smoke, an organic material, a toxic chemical, a biological agent or the performance of a network such as a cellular phone system. These sensors may be employed as security sensors, industrial machine condition monitoring sensors, individual health monitoring sensors, personal communication devices, remote traffic management systems, on-demand wireless media services, and cellular or PCS wireless network performance sensors.

It is therefore an object of an embodiment of the invention to increase the range of RF transmissions, and in particular, RF transmissions in which a limited amount of data from a sensor is transmitted at a low data rate.

DETAILED DESCRIPTION

Figure 1:
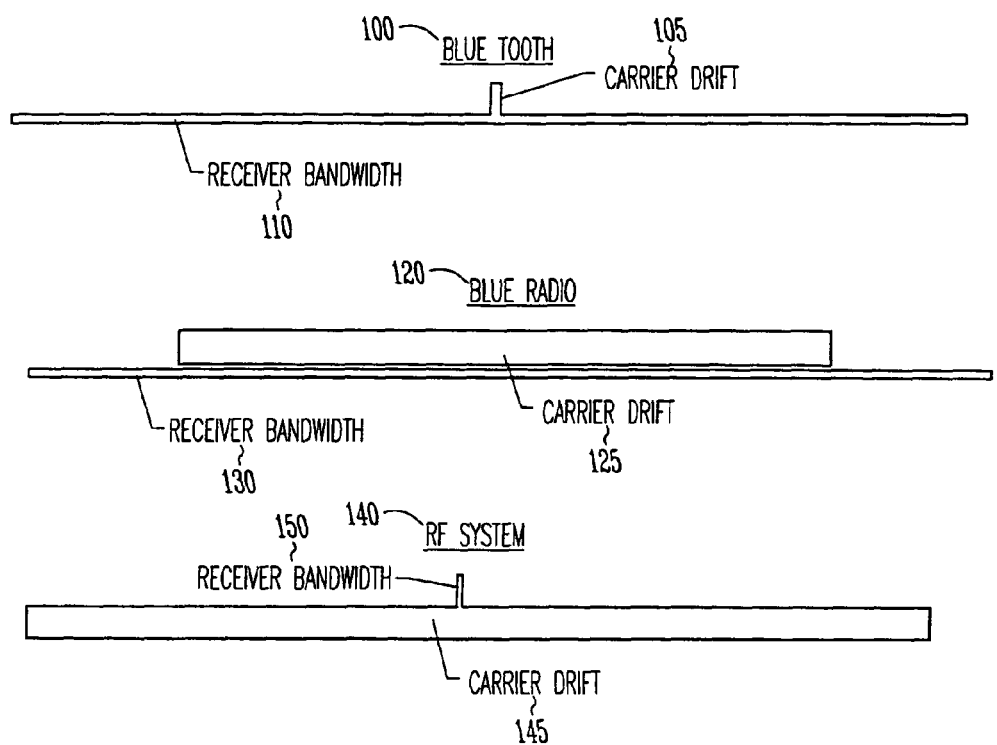
FIG. 1 illustrates the effect of frequency drift on different RF systems.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Embodiments of the invention address a variety of issues inherent in the transmission of radio frequency (RF) signals at a low data rate (e.g. 10-200 bps) to a known in the art receiver that is not able to track (or receive) the transmitted RF signals using classical approaches. These issues are introduced at both the transmitter end and the receiver end of an RF transmission. Specifically, an embodiment of the invention addresses such transmitter issues as frequency drift, multipath cancellation, frequency variation, and oscillator phase noise. Frequency drift may be caused by ambient temperature changes (+/−5 kHz) or start up temperature changes (+/−30 Hz). Multi-path cancellation refers to multiple signals reflected from objects in the vicinity of the transmitter and receiver that are received at slightly different times and sum in such a way as to produce a significantly smaller (perhaps close to zero) signal. Frequency variation may be the result of Doppler shifts caused by moving objects or movement of the transmitter and/or receiver (+/−100 Hz), and/or the vibration of the transmitter and/or receiver (+/−20 Hz). These frequency drifts and variations may be greater than the bandwidth of the receiver. For example, with a 5 Hz receiver bandwidth (required for an optimum reception of a 5 bps transmission), these effects may eliminate reception. As another example, if the range of the link between a transmitter and receiver changes at a rate of 5 mph, a 2.5 GHz RF link will exhibit a Doppler shift of almost 20 Hz (which is, once again, greater than an optimal 5 Hz receiver bandwidth for a 5 bps transmission) These variations may also occur dynamically during reception of a message (e.g., over a time period of approximately 3 seconds).

Other issues that may surface in a low data rate and narrow bandwidth RF transmission, and that are addressed in an embodiment of the invention, include multipath cancellation, oscillator phase noise levels close to the carrier, a requirement that a receiver operate at low signal levels (with low distortion), a requirement that a receiver have an active dynamic range of greater than 60 dB, and a requirement that a receiver have an ability to simultaneously detect and decode multiple messages.

Regarding multi-path cancellation, the transmitted signal reflected from many surrounding surfaces may result in a complete loss of signal in the narrow bandwidth used.

Regarding the issue of oscillator phase noise, the transmission of data at very low rates requires operating very close to the carrier frequency. For example, if the carrier frequency is 2.4 GHz, the transmission should occur within plus or minus 5 Hz of 2.4 GHz. Unfortunately, it is in this region where the oscillator phase noise is the largest, and this can result in a reduced signal to noise ratio in the transmitted signal. This can also effect the simultaneous detection of messages in the general vicinity of the carrier frequency.

At the receiver end, there are issues of detection, tracking, and demodulation of multiple simultaneous signals, the dynamic range of the receiver, out of band rejections, and general stability. Regarding simultaneous signals, a receiver should be capable of effectively detecting simultaneous message transmissions, over a received power level range of greater than 60 dB, using its rather narrow bandwidth. Moreover, this should be achieved in the presence of both the large relatively fixed frequency offsets and the dynamic frequency variations that occur throughout the duration of a message, which are significantly larger than the receiver's fixed bandwidth.

Regarding dynamic range, out of band rejection, and stability, since in an embodiment a receiver is designed to operate in a narrow bandwidth (e.g. 2-50 Hz in a 1-5 GHz range), the detection noise floor may be very low (e.g. −140 dBm). Therefore, in an embodiment, there is a requirement for a highly linear and low noise design over a large dynamic range. This keeps signal distortion, inter-modulation interference, out of band interference, and local oscillator frequency drift within acceptable limits.

The issue of frequency drift and variation, and why it is a problem for an RF system with a narrow receiver bandwidth, while it is not necessarily a problem for conventional RF transmission and reception systems, is illustrated in FIG. 1. FIG. 1 illustrates a Blue Tooth system 100, a Blue Radio system 120, and a system 140 that receives a narrow bandwidth transmission such as in an embodiment of the invention. For the Blue Tooth system, the carrier drift spectrum 105 is quite small compared to the receiver bandwidth 110. Similarly, the drift spectrum 125 for the Blue Radio system, while larger than the Blue Tooth, is still somewhat smaller than the receiver bandwidth 130. Consequently, the carrier frequency can drift to some degree in both the Blue Tooth 100 and Blue Radio 120 systems and not fall outside of the receiver bandwidth. However, in a system 140 with a narrow receiver bandwidth 150, the carrier frequency drift 145 can completely exceed the narrow receiver bandwidth 150, thereby losing the transmitted data.

Figure 2A:
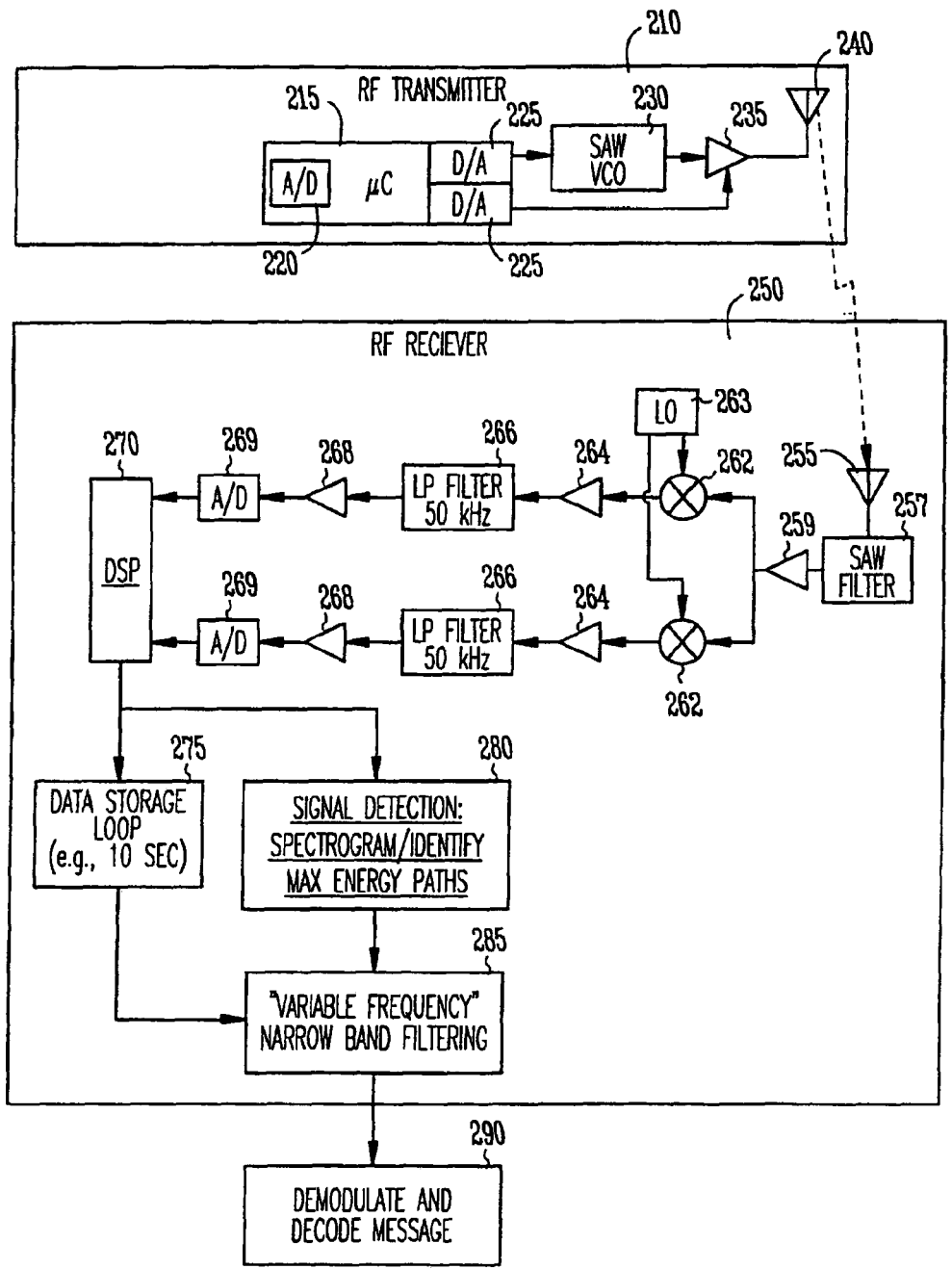
FIGS. 2a and 2b illustrate in diagrammatic form embodiments of the invention.

FIG. 2a illustrates one embodiment of the invention which includes an RF transmitter 210 connected to a data sensor, not shown, and an RF receiver 250. The transmitter 210 has a microcontroller 215 that has within it an analog to digital (A/D) converter 220. A/D converter 220 receives signals from a data sensor, which is typically an analog signal and converts it to a digital form which can be used by microcontroller 215. Microcontroller 215 applies signal processing to this signal in accordance with embedded software. Resulting actions are then passed to digital to analog (D/A) converter 225. The D/A converter 225 is connected to a voltage controlled oscillator (VCO) 230 and an amplifier 235. The amplifier 235 is connected to transmitting antenna 240.

Figure 2B:
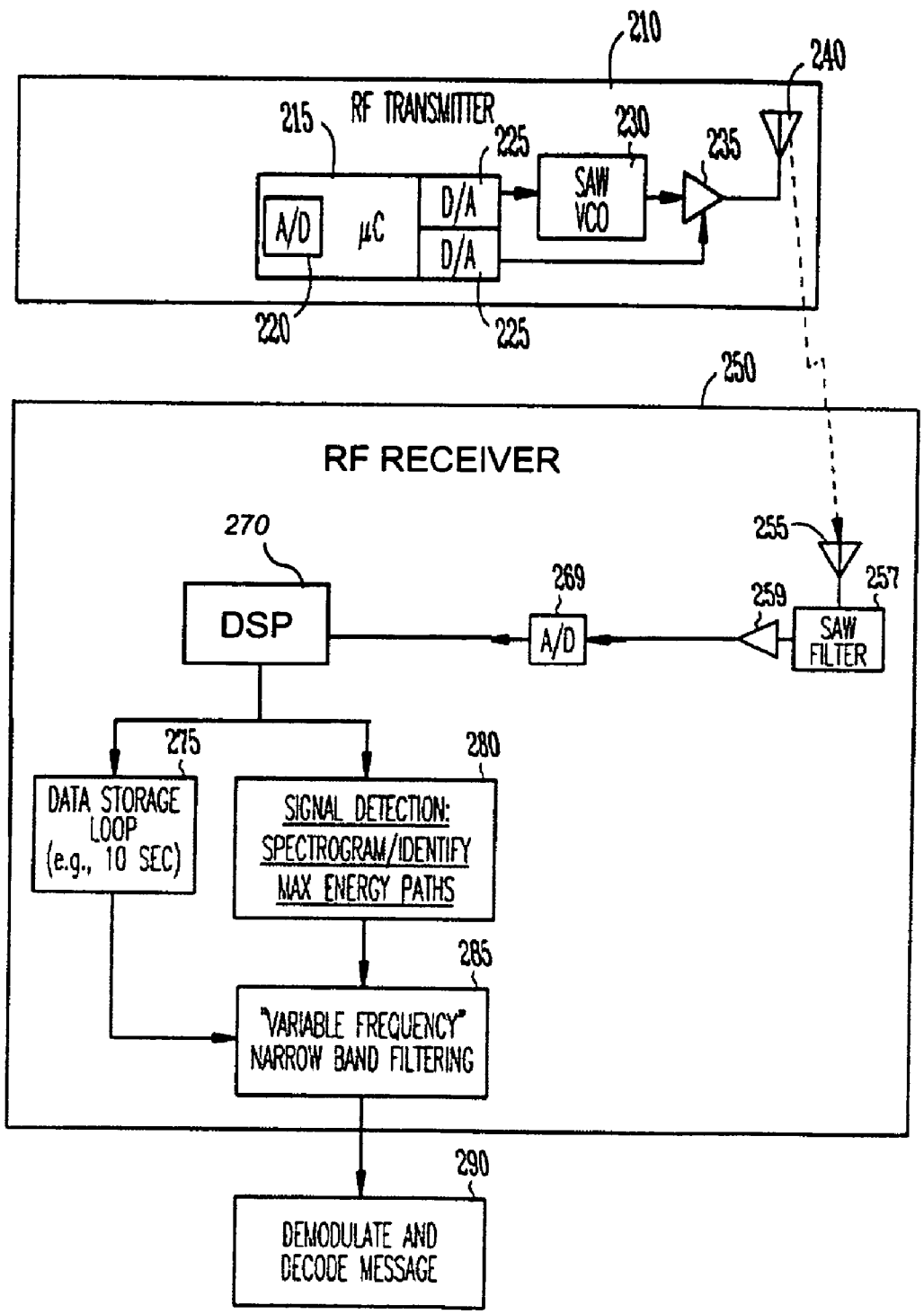

The RF receiver 250 has an antenna 255 that is connected to filter 257. Filter 257 is used for out of band rejection at the receiver and is connected to amplifier 259 and to analog to digital converter 269. This embodiment is shown in FIG. 2b. The A/D converter is connected to a signal processor 270 which may be a combination of a digital signal processor and a microprocessor or simply a microcomputer such as an IBM PowerPC or an Intel Pentium. As explained in more detail below, processor 275 handles data storage functions, signal detection 280, variable frequency narrow band filtering 285, and demodulation and decoding 290 of the RF message.

In an embodiment, shown in FIG. 2a, wherein the carrier frequency of the RF waveform is too high to be directly digitized by A/D converter 269, amplifier 259 may be connected to a parallel combination of down-converters 262, local oscillators 263, amplifiers 264, low pass filters 266 and amplifiers 268, and then digitized at a lower frequency. Such down-conversion techniques are well known to those practiced in RF electronics and signal processing.

The embodiment of FIGS. 2a and 2b can reliably transmit RF data at a low data transmission rate, and can further transmit that data to narrow band RF receiver. The embodiment of FIGS. 2a and 2b functions best when the amount of data that is transmitted is relatively small. In an embodiment, an operational range for the invention is 5-10,000 bits per second at power levels in the 0.01 mW to 10 W range. While embodiments of the invention can transmit up to the 10,000 bits per second level, the advantages the invention has over the prior art diminishes at rates greater than 5,000 bps. Compared to conventional RF transmissions, the data rate and the receiver bandwidth are both reduced on the order of approximately 1000—thereby achieving the same transmission-ranges at one thousandth of the power (or alternatively, maintaining the same power and increasing the range of transmission by a factor of about 5 to about 50 depending on the medium through which the signal is transmitted).

A conventional RF transmission link will not operate at this improved capacity, however, simply by turning down the data rate and narrowing the bandwidth. The reason for this is that as previously discussed, carrier frequency variations that are not normally important for conventional RF link designs become a source of error when the receiver bandwidth is narrowed. As graphically illustrated in FIG. 1, these variations can be 10-1000 times larger than the narrow receiver bandwidth used in embodiments of the invention, thereby obscuring the data within the narrow bandwidth expected by the receiver. Consequently, embodiments of the invention provide hardware and software design innovations for both the transmitter and receiver to overcome these challenges associated with the narrow receiver bandwidth. Therefore, in an embodiment, one or more features are added to the system to allow this reduction of transmission rate and narrowing of bandwidth, while maintaining successful transmission of sensor data from with the RF link.

Figure 3:
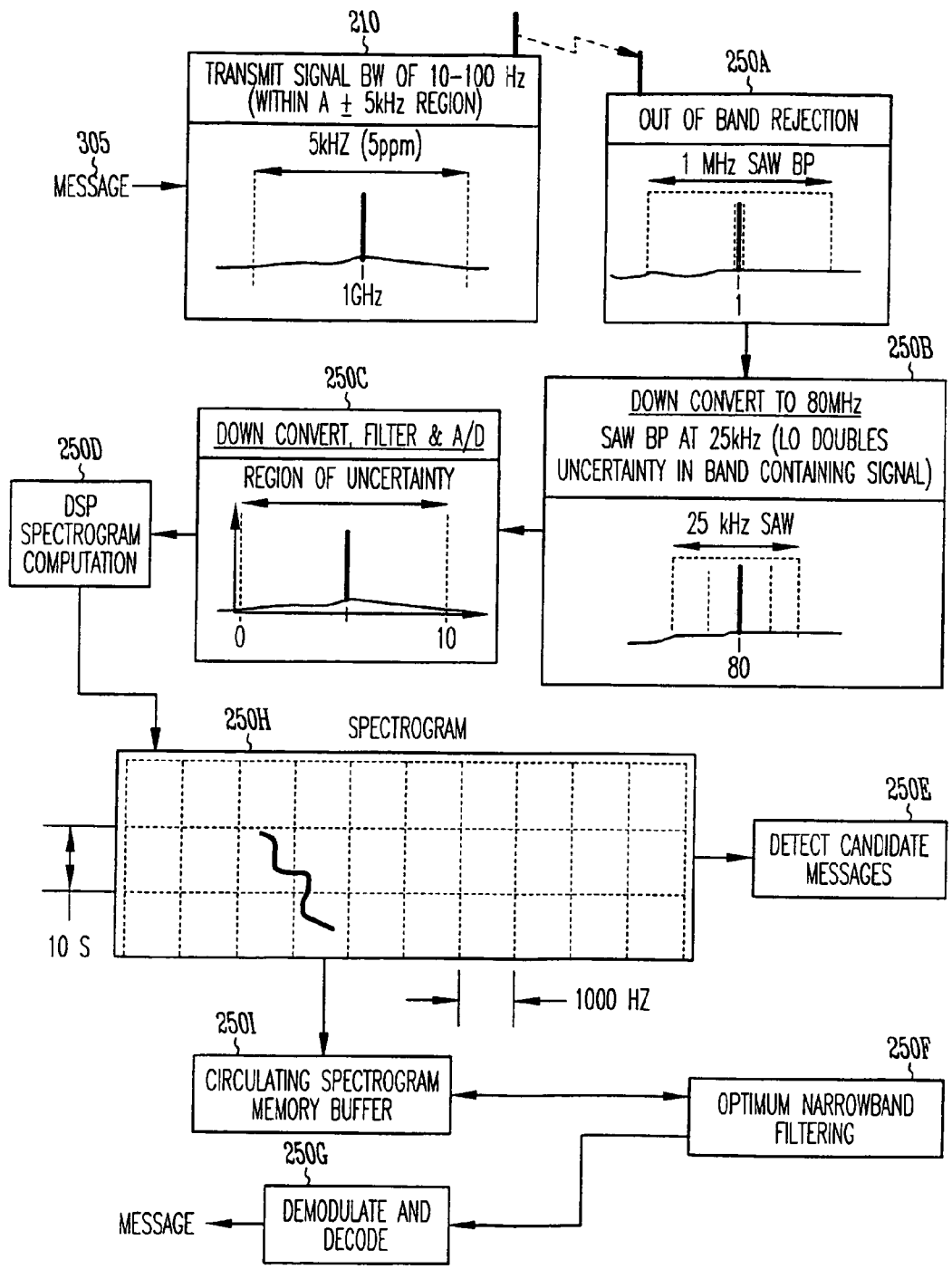
FIG. 3 illustrates the transmission of a data message in an embodiment of the invention.

FIG. 3, in conjunction with FIGS. 2a and 2b, illustrates the transmission and reception of an RF signal containing sensor data using an embodiment of the invention. In FIG. 3, sensor information 305 is submitted to transmitter 210. The message 305 may be in digital or analog format. If it is in analog format, it is converted to digital by A/D converter 220. In the digital format, the microprocessor 215 may further process the message. After processing, the message is converted to analog format by D/A converter 225, and then transmitted to receiver 250a.

In the transmission example of FIG. 3, the transmitted signal has a bandwidth of 10-100 Hz that is modulated into a 1 GHz transmission frequency. In a simple commercial-off-the-shelf (COTS) transmitter at this frequency, there could be a drift in the carrier frequency of as much as 5 kHz. This drift may result from the instability of the transmitter's oscillator, the phase noise associated with the oscillator, or some other source of frequency drift. To counter this drift, a phase lock loop oscillator is used in the transmitter, which will correct any drift in the frequency from the desired transmission frequency. In the example of FIG. 3, the desired modulation frequency is 1 GHz, and a SAW resonator-based oscillator was used instead of the VCO with the PLL due to the desire to reduce cost and complexity. In addition, a predetermined frequency shift is introduced into the signal to combat multi-path cancellation. This frequency shift may be a simple linear shift with time.

Also present in the transmitter is a frequency control element such as a crystal oscillator, a SAW oscillator, or both. The oscillator stability limits the extent to which the receiver bandwidth can be narrowed. If the oscillator drifts slowly, the receiver signal processing will compensate. Notwithstanding, the drift rate or jitter will directly limit the receive bandwidth that can be used. The signal, including drift, jitter and the purposeful linear shift in frequency must remain within the receiver bandwidth for a least one bit duration, otherwise, the signal will be missed because it will be out of band and filtered out. A further issue is phase noise, which limits the dynamic range over which multiple signals may be simultaneously detected.

The modulated signal is transmitted to the receiver 250a. In this embodiment, a 1 MHz SAW band pass filter rejects all out of band frequencies. Therefore, in the example of FIG. 3, the frequencies that are allowed to pass are 1 GHz plus or minus 0.5 MHz, and those outside that frequency bandwidth are rejected.

The receiver 250b down converts the received message to about 80 MHz. The signal is passed through a second SAW band pass filter which rejects frequencies outside of a 25 kHz band. The signal is down converted once again to some intermediate frequency (IF) range, and further filtered. The signal is then converted into digital format by A/D converter 269.

In conventional receivers, after the signal is down-converted to the IF range, it is filtered and then demodulated to reveal the original data. This conventional process of reception, down-converting, filtering and demodulation is illustrated in FIG. 3 where the message 305 is received at 250a, down-converted at 250b and 250c, and demodulated and decoded at 250g. However, given the narrowband problems associated with low data rate RF transmissions, it would be extremely difficult if not impossible to have such filtering capacity because one would not know where to expect the signal (because of drift and other phenomena). Therefore, in an embodiment, there is a dynamic filter with a changing center frequency to follow the changing signal that includes drift and the purposeful frequency shift, which is now in the IF range. This can be thought of as a "digital phased lock loop" because it tracks the varying signal(s) in the digital realm. After the A/D conversion by 269, the signal is analyzed by the DSP 250d (270). The DSP looks at a block of 10 seconds of the incoming signal and for each of the 0.05 seconds in the 10 second block it computes a 200 point Fast Fourier Transform (FFT) using 5 Hz (which in this particular example is the original signal's bandwidth) frequency bins. Two hundred time intervals are possible during the 10 second block since 200*0.05=10, and also each vertical time slice looks at 1000 Hz chunks of spectrum since 200*5=1000. As the result, the Spectrogram 250h that shows the 3×10 matrix of frequency versus time, contains 200 time and 200 frequency points in each of its cells. This data is computed in real time and placed into the Circulating Spectrogram Memory Buffer 250i—whose purpose is to store historical data. Consequently, it is possible to detect the time varying signals of interest (i.e. candidate sensor messages) using a huge number of potential frequency variation paths by seeking the one with the largest integrated energy.

Since so many data points are employed, determining the location of the drifting signal using conventional computer processing would be inefficient and would not produce good results in real time. However, dynamic programming, which is a form of recursion, can be used to "crunch" many numbers very fast and reduce the complexity from an Order (2.sup.N) problem to Order (N.sup.2). It solves complex mathematical problems recursively by tackling them backwards—first considering the best decision given the last result, and then the next to the last result, and so on. Dynamic Programming 250e is used to come up with the most likely frequency shifting of the candidate message using statistical analysis of the frequency-time spectrogram data. At this point the system does not necessarily "care" about what is in the signals, it just wants to describe the changing behavior of the signals. This is in turn used by the Optimum Narrowband Filtering 250f to remove the frequency-related drifts and variations from the signal at hand, effectively becoming a "digital phase lock loop" dynamic filter that is capable of changing its center frequency to follow the changes. Once this is done, the original data signal can be extracted from the received signal and demodulated as it normally would be if there was no frequency change present.

In an embodiment, a filter is placed in the receiver for the purposes of out of band interference and noise rejection. However, the receiver bandwidth is extremely narrow—the full band at 1 GHz is only 50 kHz, which is narrower than available front end filters. Narrow band SAW filters are available in bandwidths of 100's of kHz. However, if filtering is not used at the front end, then moderate interference anywhere in the allowed band could corrupt communications. There should also be follow-on filtering and an IF and/or baseband to further constrain the noise and interference down to the band of interest.

While the invention has been described in connection with the transmission of data bits, it is noted that the invention can also transmit speech if a restricted vocabulary (e.g., less than 500 words) and speaker dependent word recognition chips are used.

Figure 4A:
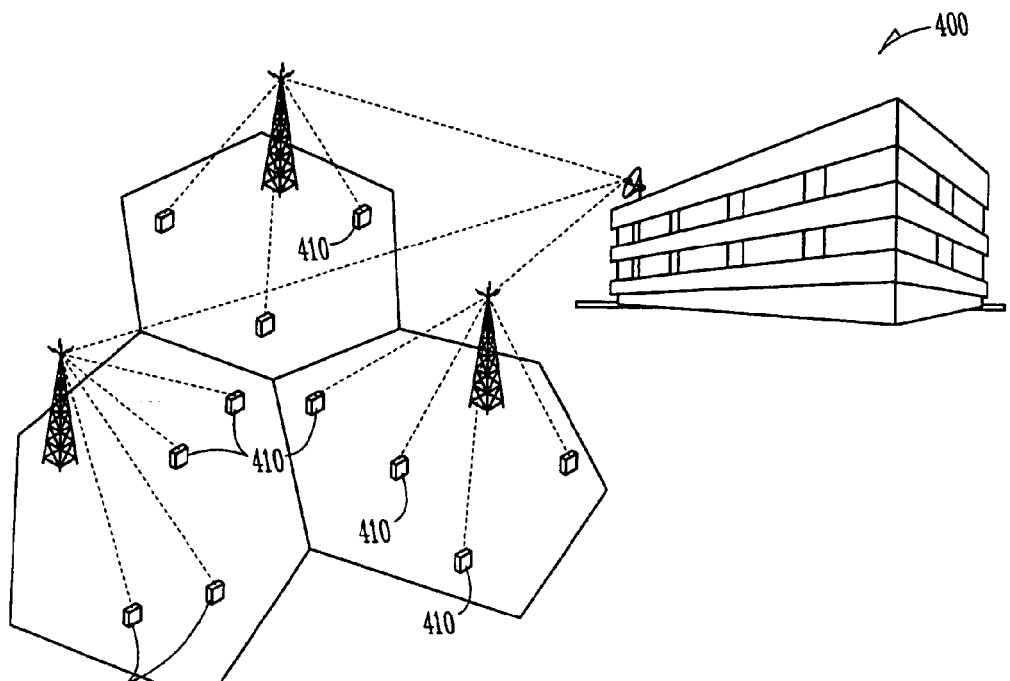
FIGS. 4a and 4b illustrate an embodiment of the invention used in connection with a performance monitoring system for wireless networks.
Figure 4B:
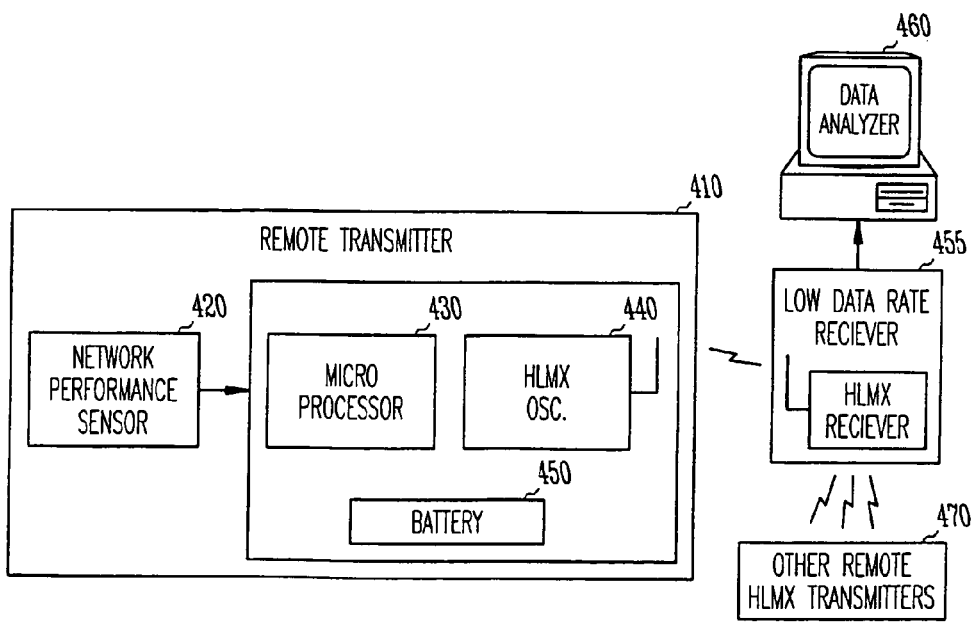

An embodiment of a low data rate RF link of the invention may be used in connection with a performance monitoring system for wireless networks. A wireless network, such as a cellular system, may develop problems therein which are hard to locate. By monitoring data on a cellular tower, this data can then be transmitted to a base station where it can be analyzed in real time or down loaded for later analysis. FIGS. 4a and 4b illustrate such a system 400. A remote low data rate transmitter 410 would be placed on a cellular tower. The transmitter would have a network performance sensor 420, a microprocessor 430, a low data rate oscillator 440, and some type or power supply 450. The transmitter 410 transmits the data to a low data rate receiver 450, which then transmits it to an analyzer 460.

In the foregoing detailed description of embodiments of the invention, various features are grouped together in one or more embodiments for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The abstract is provided to comply with 37 C.F.R. 1.72(b) to allow a reader to quickly ascertain the nature and gist of the technical disclosure. The Abstract is submitted with the understanding that it will not be used to interpret or limit the scope or meaning of the claims.

What is claimed:

1. A receiver comprising:
   a processor configured to:
      determine a plurality of Fast Fourier Transforms of a plurality of signal segments of a signal;
      store the plurality of Fast Fourier Transforms; and
      determine, recursively, a frequency shift of the signal based on the stored plurality of Fast Fourier Transforms of the plurality of signal segments.

2. The receiver of claim 1, further comprising a first surface acoustic wave (SAW) filter configured to pass a first band of frequencies, wherein the first band of frequencies include a frequency of the signal.

3. The receiver of claim 2, further comprising a second SAW filter configured to pass a second band of frequencies, wherein the second band of frequencies include the frequency of the signal.

4. The receiver of claim 3, wherein the processor is further configured to adjust a first center frequency of the first SAW filter and a second center frequency of the second SAW filter based on the determined frequency shift.

5. The receiver of claim 1, further comprising an analog to digital converter configured to digitize the signal for input to the processor.

6. The receiver of claim 1, wherein the frequency shift of the signal is determined by:
   calculating an energy of each of a plurality of frequency paths, wherein each of the plurality of frequency paths includes at least one of the stored plurality of Fast Fourier Transforms of the plurality of signal segments; and
   selecting a frequency path of the plurality of paths with the greatest energy.

7. The receiver of claim 1, wherein the signal comprises data from at least one of a sensor, a speech converter, and a network monitor.

8. The receiver of claim 1, wherein the signal has a data rate less than or equal to 200 bits per second.

9. An article of manufacture including a tangible computer-readable medium having instructions stored thereon that, if executed by a computing device, cause the computing device to perform operations comprising:
   determining a plurality of Fast Fourier Transforms of a plurality of signal segments of a signal;
   storing the plurality of Fast Fourier Transforms; and
   determining, recursively, a frequency shift of the signal based on the stored plurality of Fast Fourier Transforms of the plurality of signal segments.

10. The article of manufacture of claim 9, further comprising instructions to adjust a center frequency of a SAW filter based on the determined frequency shift, wherein the SAW filter is configured to pass a band of frequencies including a frequency of the signal.

11. The article of manufacture of claim 9, wherein determining the frequency shift of the signal comprises:
   calculating an energy of each of a plurality of frequency paths, wherein each of the plurality of frequency paths includes at least one of the stored plurality of Fast Fourier Transforms of the plurality of signal segments; and
   selecting a frequency path of the plurality of frequency paths with the greatest energy.

12. The article of manufacture of claim 9, wherein storing the plurality of Fast Fourier Transforms comprises:
   storing each Fast Fourier Transform of the plurality of Fast Fourier Transforms in a frequency bin based on a frequency of each Fast Fourier Transform.

13. The article of manufacture of claim 9, wherein the signal comprises data from at least one of a sensor, a speech converter, and a network monitor.

14. The article of manufacture of claim 9, wherein the signal has a data rate less than or equal to 200 bits per second.

15. A method of frequency tracking comprising:
   determining a plurality of Fast Fourier Transforms of a plurality of signal segments of a signal;
   storing the plurality of Fast Fourier Transforms; and
   determining, recursively, a frequency shift of the signal based on the stored plurality of Fast Fourier Transforms of the plurality of signal segments.

16. The method of claim 15, further comprising adjusting a center frequency of a SAW filter based on the determined frequency shift, wherein the SAW filter is configured to pass a band of frequencies including a frequency of the signal.

17. The method of claim 15, wherein determining the frequency shift of the signal comprises:
   calculating an energy of each of a plurality of frequency paths, wherein each of the plurality of frequency paths includes at least one of the stored plurality of Fast Fourier Transforms of the plurality of signal segments; and
selecting a frequency path of the plurality of frequency paths with the greatest energy.

18. The method of claim 15, wherein storing the plurality of Fast Fourier Transforms comprises:
   storing each Fast Fourier Transform of the plurality of Fast Fourier Transforms in a frequency bin based on a frequency of each Fast Fourier Transform.

19. The method of claim 15, wherein the signal comprises data from at least one of a sensor, a speech converter, and a network monitor.

20. The method of claim 15, wherein the signal has a data rate less than or equal to 200 bits per second.

* * * * *